No. 671,671. Patented Apr. 9, 1901.
J. S. HORSLEY.
COMBINED FAUCET AND BOTTLE WASHER.
(Application filed Sept. 6, 1900.)
(No Model.)

Witnesses:
George Oltsch
Hugo Oltsch

John Shelton Horsley.
Inventor

UNITED STATES PATENT OFFICE.

JOHN SHELTON HORSLEY, OF EL PASO, TEXAS.

COMBINED FAUCET AND BOTTLE-WASHER.

SPECIFICATION forming part of Letters Patent No. 671,671, dated April 9, 1901.

Application filed September 6, 1900. Serial No. 29,206. (No model.)

*To all whom it may concern:*

Be it known that I, JOHN SHELTON HORSLEY, a citizen of the United States, residing at El Paso, in the county of El Paso and State of Texas, have invented certain new and useful Improvements in a Combined Faucet and Bottle-Washer; and I do hereby declare the following to be a full, clear, and exact description of the invention, such as will enable others skilled in the art to which it appertains to make and use the same.

My invention relates to a combined faucet and bottle-washer; and the object of my invention is to produce a faucet which can be used merely as a faucet or which can be used for washing bottles, as may be desired.

My invention consists in a nozzle or body of the faucet, a turning plug which extends horizontally therethrough and which plug has a portion of one side of its surface cut away, combined with means for regulating the distance the plug shall be turned according to the use to which it is to be applied, and a pipe extending from the nozzle or frame opposite the upper portion of the plug and through which pipe water is forced when the plug is turned into the proper position for the purpose of washing bottles, cans, and other such implements, as will be more fully described hereinafter.

Heretofore attachments have been provided for faucets and which when applied to an ordinary faucet enables bottles and other such devices to be washed; but the attachment has to be separated from the faucet when the faucet is to be used for drawing water. My invention differs from this in having the bottle and can washer formed as a part of the faucet, so that the faucet can be used for drawing water or washing cans and bottles, as may be desired, without having to remove or replace any other part.

Figure 1:
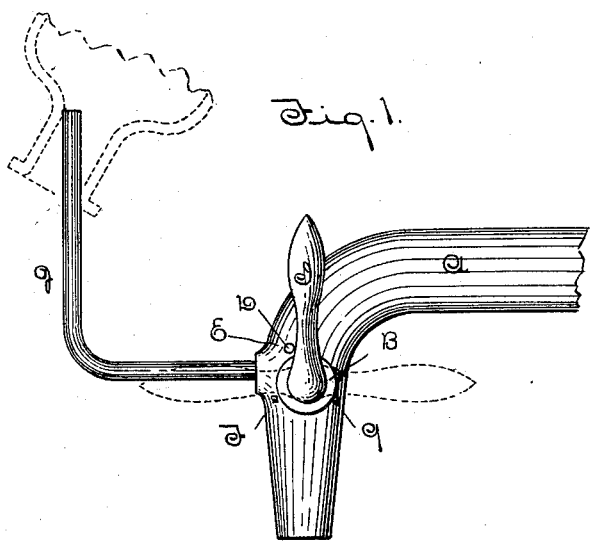
Figure 2:
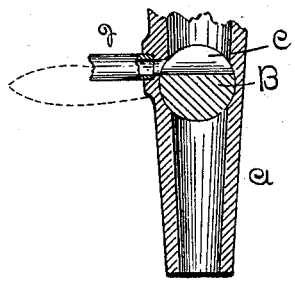
Figure 3:
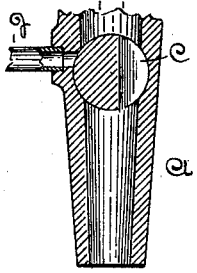
Figure 4:
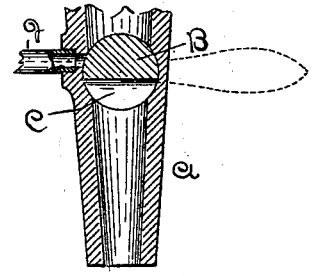

In the accompanying drawings, Figure 1 is a side elevation showing my invention complete. Fig. 2 is a vertical section showing the plug turned so as to force water through the pipe for washing bottles, cans, and other such devices. Fig. 3 shows a plug turned so as to shut off the water from the pipe and to enable water to be drawn from the faucet in the usual manner. Fig. 4 shows the plug turned so as to shut off all flow of the water.

A represents the nozzle or frame of the faucet and which may be either of the shape here shown or any other that may be preferred and which has the turning plug B extending horizontally through it at a suitable distance from its lower end. This turning plug has the cut-away or grooved portion C through one side and which extends about two-fifths of the thickness of the plug and which cut-away portion allows the water to be drawn from the faucet when turned into the position shown in Fig. 3 or to be used as a bottle-washer when turned as shown in Fig. 2 or to have all water shut off when turned as shown in Fig. 4. To the outer end of this plug is secured a handle I, by means of which the plug is turned into the desired position, as shown by dotted lines in Fig. 1, and in order to enable the plug to be turned exactly into the position desired suitable openings E F G are formed in the side of the nozzle or frame A, and in these openings is inserted a stop-pin D, against which the handle I is made to strike. This handle extends outwardly from the plug in a line with the cut-away portion C, and hence when the handle is turned so as to strike against the pin when inserted in the opening G the plug is turned, as shown in Fig. 4, so as to shut off all flow of water through the faucet. When the plug is turned so as to strike against the pin D, as shown in Fig. 1, the cut-away portion C is turned in a line with the body A and water can be drawn as from an ordinary faucet, and when the handle is turned so as to strike against the pin D when inserted in the hole F the water is forced through the pipe J. This pipe J, of suitable size and shape, is screwed into the side of the nozzle or faucet above the center of the turning plug, and when the plug is turned, so that the cut-away portion C is in the position shown in Fig. 2, the water passes through the opening in the side of the nozzle or frame and through the pipe J into the bottle or can, which is inverted over the upper end of the pipe, as shown in Fig. 1. The opening through the nozzle or frame to which the pipe J is connected is placed in such relation to the turning plug that no water will pass through the pipe until the plug is turned so that the handle I will strike against the pin when inserted in the hole F. When the plug is turned into either one of the positions shown in Figs. 3 and 4, this opening is entirely closed, and hence no water will be forced through the pipe J except when the pin D is inserted in the hole F. As two pins D may be used and one inserted in each of the holes E and G the handle I will have a play only back and forth between these two pins, and then the faucet can only be used for drawing water in the ordinary manner, and no mistake will ever be made in turning the plug so that the water will be forced through the pipe J. The water is forced through this pipe J only when the pin D is removed from the hole E and inserted in the hole F.

Having thus described my invention, I claim—

1. In a combined faucet and bottle-washer, a nozzle or frame of a faucet, a cut-away plug extending horizontally through it, and having a groove cut through its side, suitable stops for limiting the movement of the handle of the plug, and a pipe extending from the side of the nozzle or frame through which water may be forced when the plug is turned in the proper position for that purpose, substantially as shown.

2. In a combined faucet and bottle-washer, a nozzle or frame, a turning plug having a portion of its surface cut away and provided with a handle, combined with suitable stops applied to the faucet or frame for limiting the movement of the handle, and a pipe attached to the nozzle or frame opposite the upper portion of the turning plug, and extending from the nozzle at right angles to the length of the plug, substantially as set forth.

In testimony whereof I affix my signature in presence of two witnesses.

JOHN SHELTON HORSLEY.

Witnesses:
W. S. SMALLWOOD,
A. E. BROWN.